US011541839B2

(12) United States Patent
Koh (10) Patent No.: US 11,541,839 B2
(45) Date of Patent: Jan. 3, 2023

(54) AIRBAG CUSHION FOR VEHICLE

(71) Applicant: HYUNDAI MOBIS CO. LTD., Seoul (KR)

(72) Inventor: Min Seok Koh, Yongin-si (KR)

(73) Assignee: HYUNDAI MOBIS CO. LTD., Seoul (KR)

( * ) Notice: Subject to any disclaimer, the term of this patent is extended or adjusted under 35 U.S.C. 154(b) by 0 days.

(21) Appl. No.: 17/359,469

(22) Filed: Jun. 25, 2021

(65) Prior Publication Data

US 2021/0402945 A1 Dec. 30, 2021

(30) Foreign Application Priority Data

Jun. 26, 2020 (KR) .................. 10-2020-0078340

(51) Int. Cl.
*B60R 21/231* (2011.01)
*B60R 21/235* (2006.01)
*B60R 21/205* (2011.01)

(52) U.S. Cl.
CPC .......... *B60R 21/231* (2013.01); *B60R 21/235* (2013.01); *B60R 21/205* (2013.01); *B60R 2021/23538* (2013.01); *B60R 2021/23576* (2013.01)

(58) Field of Classification Search
CPC ............... B60R 21/231; B60R 21/203; B60R 21/205; B60R 2021/23538; B60R 2021/23576; B60R 2021/23571; B60Y 2304/05
USPC ..................... 280/743.1, 731, 732
See application file for complete search history.

(56) References Cited

FOREIGN PATENT DOCUMENTS

JP 2018075970 A * 5/2018
KR 10-2013-0070282 6/2013

* cited by examiner

*Primary Examiner* — Keith J Frisby
(74) *Attorney, Agent, or Firm* — DLA Piper LLP (US)

(57) ABSTRACT

An airbag cushion for a vehicle may include: a front panel disposed in a direction facing a passenger when the airbag cushion is inflated, and having a front sewed part formed along the edge thereof; and a rear panel coupled to the front panel so as to form a chamber therebetween, having a gas introduction hole to introduce gas into the chamber, and having a rear sewed part formed along the edge thereof, the rear sewed part being coupled to the front sewed part, wherein the rear sewed part has a curvature part formed in a curved shape at the portion coupled to the front sewed part.

7 Claims, 7 Drawing Sheets

Prior Art

AIRBAG CUSHION FOR VEHICLE

CROSS-REFERENCE TO RELATED APPLICATION

This application claims priority from and the benefit of Korean Patent Application No. 10-2020-0078340, filed on Jun. 26, 2020, which is hereby incorporated by reference for all purposes as if set forth herein.

BACKGROUND

Field

Exemplary embodiments of the present disclosure relate to an airbag cushion for a vehicle, and more particularly, to an airbag cushion for a vehicle, which includes two panels to freely change the deployment shape of the airbag cushion.

Discussion of the Background

In general, an airbag system of a vehicle refers to an apparatus that can instantaneously inflate an airbag to reduce an injury risk caused by an impact, in case of a vehicle collision.

The airbag system is mounted in the steering wheel of a driver seat or a passenger seat. When an impact is applied to the vehicle, the airbag cushion is deployed by gas supplied from an inflator, and thus prevents an injury to a passenger.

Figure 1:
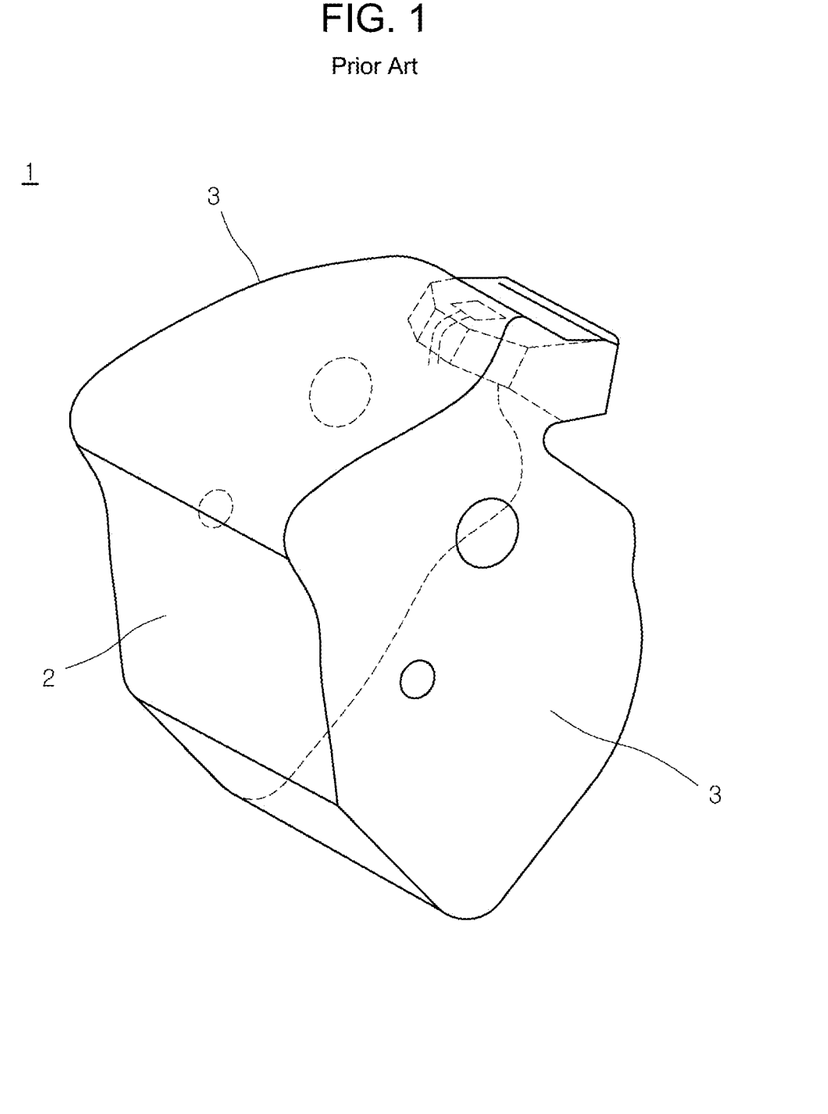
FIG. 1 is a perspective view illustrating a conventional airbag cushion.
Figure 2:
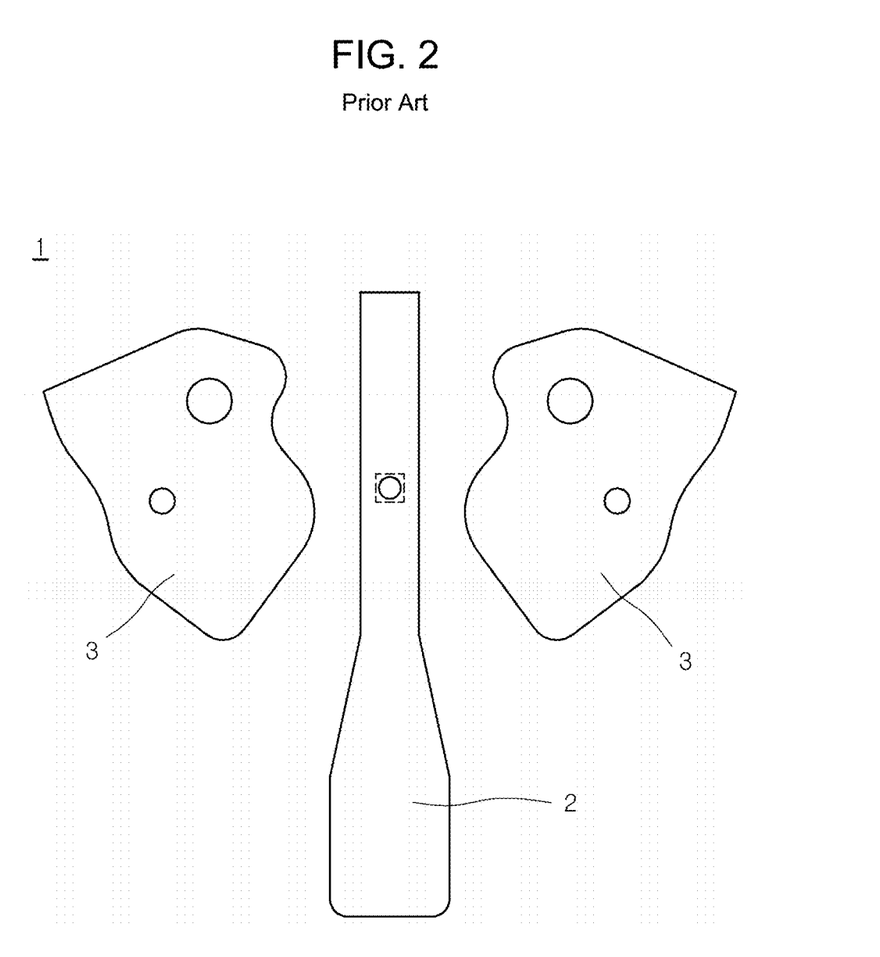
FIG. 2 is a developed view separately illustrating a main panel and side panels of the conventional airbag cushion.

FIGS. 1 and 2 illustrate a conventional airbag cushion 1. The conventional airbag cushion 1 includes one main panel 2 and a pair of side panels 3 coupled to both sides of the main panel 2, respectively. The main panel 2 and the side panels 3 each have a filling room formed therein, and the filling room includes a front tether to maintain the shape of the filling room in a front-to-rear direction during deployment, and a horizontal side tether to maintain the shape of the filling room in a side-to-side direction during deployment.

However, the conventional airbag cushion has a complex structure and a large volume and thus has difficulties in securing a storage space. Furthermore, since even a corner portion of the airbag cushion, to which the main panel and the side panel are coupled, needs to be filled with gas, the inflation speed may be slowed down to make it difficult to protect a passenger.

The related art of the present disclosure is disclosed in Korean Patent Application Laid-Open No. 10-2013-0070282 published on Jun. 27, 2013 and entitled "Airbag Cushion for Passenger Seat".

SUMMARY

Various embodiments are directed to an airbag cushion for a vehicle, which can freely change the deployment shape thereof by changing the shapes of curvature parts in consideration of the type and internal structure of a vehicle and the arrangement of other parts.

Also, various embodiments are directed to an airbag cushion for a vehicle, which is configured by coupling two panels to each other, and can reduce the manufacturing cost and weight of the airbag cushion because the structure thereof is simplified and the number of parts is reduced, thereby improving the packaging performance and productivity.

Also, various embodiments are directed to an airbag cushion for a vehicle, which can raise the deployment speed of the airbag cushion, thereby stably protecting a passenger at an early stage.

In an embodiment, an airbag cushion for a vehicle may include: a front panel disposed in a direction facing a passenger when the airbag cushion is inflated, and having a front sewed part formed along an edge thereof; and a rear panel coupled to the front panel so as to form a chamber therebetween, having a gas introduction hole to introduce gas into the chamber, and having a rear sewed part formed along an edge thereof, the rear sewed part being coupled to the front sewed part, wherein the rear sewed part has a curvature part formed in a curved shape at a portion coupled to the front sewed part.

The rear panel may include a rear panel body having the rear sewed part formed along the edge thereof. The rear sewed part may include: a first rear sewed part disposed at an upper portion of the rear panel body based on a center of the rear panel body, and coupled to a top of the front sewed part; a second rear sewed part disposed under the first rear sewed part, and coupled to a bottom of the front sewed part; and a third rear sewed part disposed between the first and second rear sewed parts, and including an upper coupling part and a lower coupling part, which are divided based on the center of the rear panel body and coupled to each other.

The first rear sewed part may include: a first rear center part; and a first rear curvature part disposed on either side of the first rear center part, having one end connected to the first rear center part and the other end connected to the upper coupling part, and having a downward curvature toward the center of the rear panel body.

The second rear sewed part may include: a second rear center part; and a second rear curvature part disposed on either side of the second rear center part, having one end connected to the second rear center part and the other end connected to the lower coupling part, and having a downward curvature in a direction away from the center of the rear panel body.

The curvatures of the first and second rear curvature parts may be decided in consideration of a shape of the chamber when the airbag cushion is inflated.

The front panel may include a front panel body having the front sewed part formed along the edge thereof. The front sewed part may include: a first front sewed part coupled to the first rear sewed part; and a second front sewed part extended from a bottom of the first front sewed part, and coupled to the second rear sewed part.

The first front sewed part may include: a first front center part formed to correspond to the first rear center part, and coupled to the first rear center part; and a first front curvature part provided on either side of the first front center part, having a curvature corresponding to the first rear curvature part, and coupled to the first rear curvature part.

The second front sewed part may include: a second front center part formed to correspond to the second rear center part, and coupled to the second rear center part; and a second front curvature part provided on either side of the second front center part, having a curvature corresponding to the second rear curvature part, and coupled to the second rear curvature part.

The shape of the curvature part may be decided in consideration of the shape of the chamber when the airbag cushion is inflated.

In accordance with the embodiment of the present disclosure, the shape of the curvature part may be changed in consideration of the type and internal structure of a vehicle, the arrangement of other parts and the like, which makes it possible to freely change the deployment shape of the airbag cushion. Therefore, in accordance with the embodiment of the present disclosure, the shape of the airbag cushion (or specifically, the shape of the side surface of the airbag cushion) may be implemented in various manners depending on the type of the vehicle or the installation environment of the airbag cushion.

Furthermore, in accordance with the embodiment of the present disclosure, two panels (i.e. the front panel and the rear panel) may be coupled to each other, which makes it possible to simplify the structure of the airbag cushion and to reduce the number of parts. Thus, since the manufacturing cost, weight and volume of the airbag cushion can be reduced, the packaging performance and the productivity may be improved.

Furthermore, unlike the conventional airbag cushion, the airbag cushion in accordance with the embodiment of the present disclosure has no corner portion that is formed by the side panel and the main panel, which are coupled to each other, in the conventional airbag cushion. Thus, the deployment of the airbag cushion may be speeded up to safely protect a passenger at an early stage.

DETAILED DESCRIPTION OF THE ILLUSTRATED EMBODIMENTS

Hereinafter, exemplary embodiments of the present disclosure will be described below with reference to the accompanying drawings.

First, the following embodiments are embodiments suitable for promoting understandings of the technical features of an airbag cushion for a vehicle in accordance with the present disclosure. However, the present disclosure is not limited to the following embodiments, the technical features of the present disclosure are not limited by the following embodiments, and the present disclosure can be modified in various manners without departing from the scope of the present disclosure.

Figure 3:
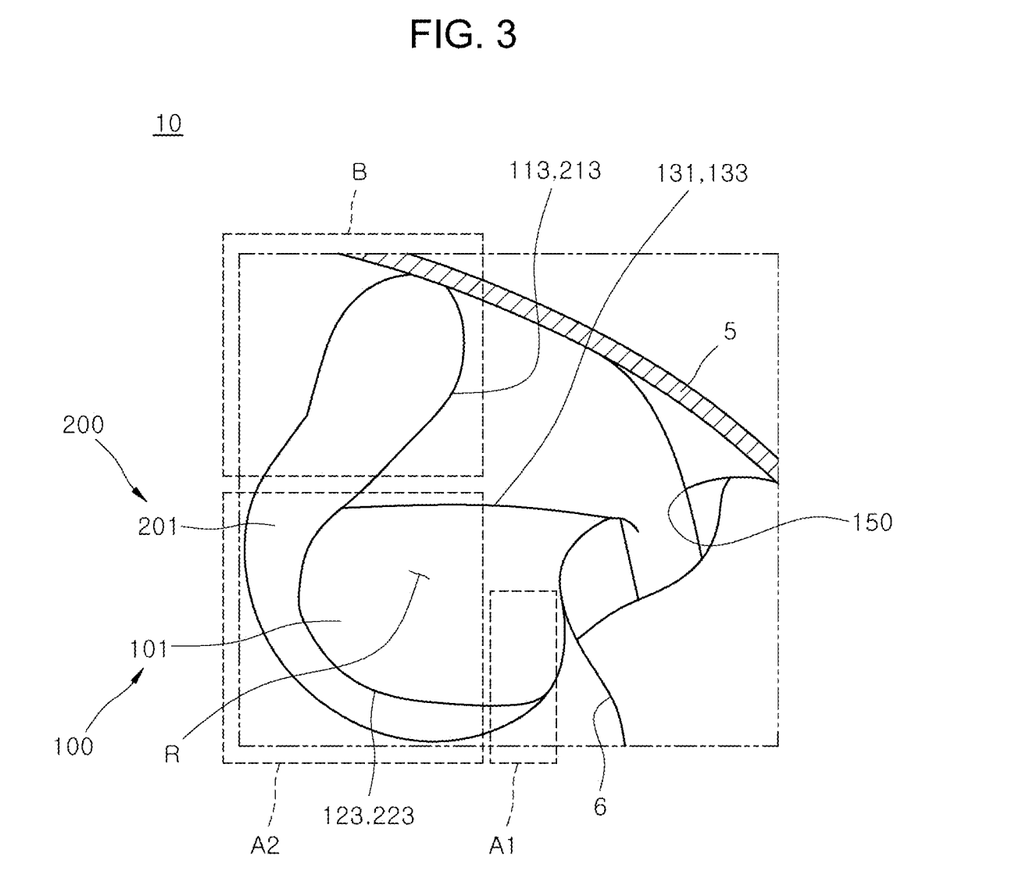
FIG. 3 is a side view illustrating that an airbag cushion for a vehicle in accordance with an embodiment of the present disclosure is coupled to a vehicle body.
Figure 4:
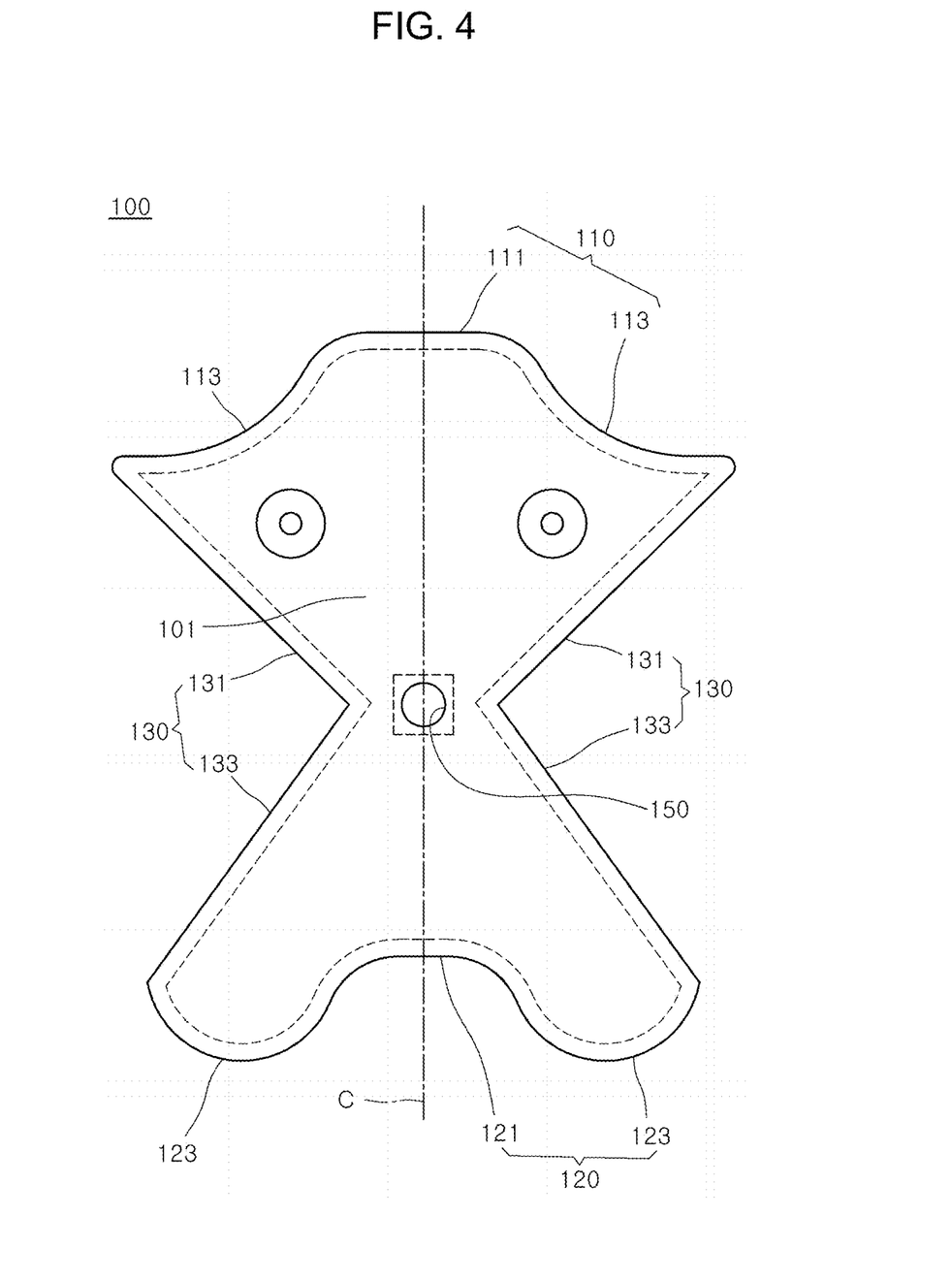
FIG. 4 is a developed view illustrating a rear panel in accordance with the embodiment of the present disclosure.
Figure 5:
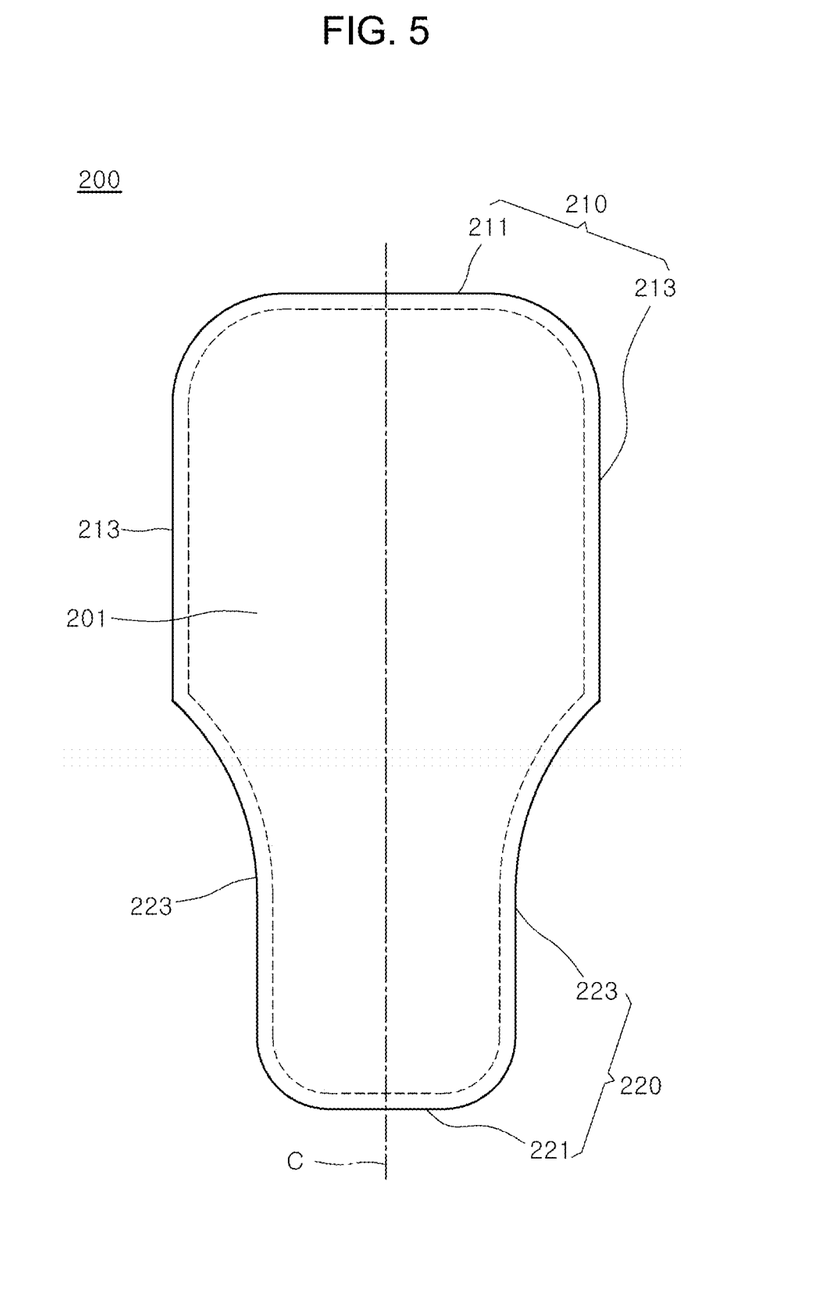
FIG. 5 is a developed view illustrating a front panel in accordance with the embodiment of the present disclosure.
Figure 6:
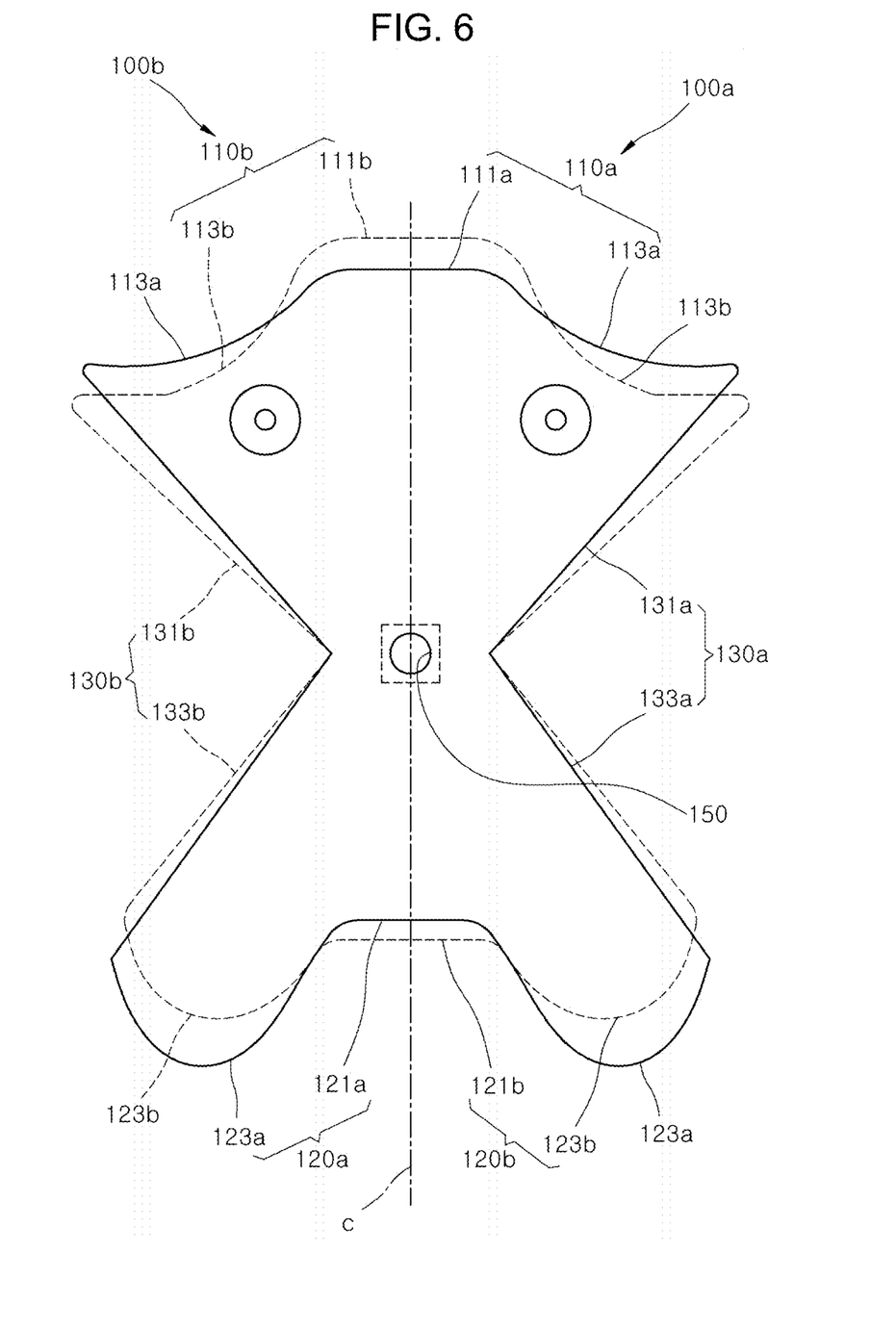
FIG. 6 is a developed view illustrating a modification of the rear panel illustrated in FIG. 4.
Figure 7:
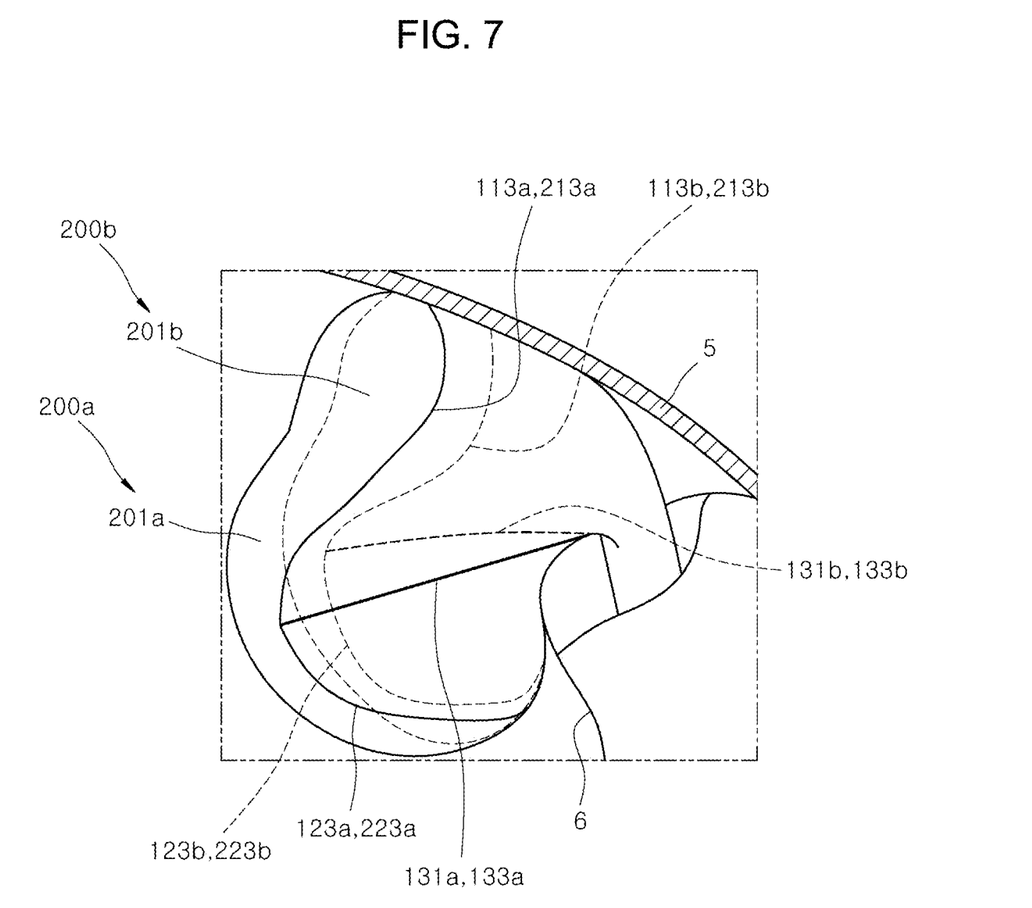
FIG. 7 is a diagram illustrating the shape of an airbag cushion in accordance with the modification of FIG. 6.

FIG. 3 is a side view illustrating that an airbag cushion for a vehicle in accordance with an embodiment of the present disclosure is coupled to a vehicle body, FIG. 4 is a developed view illustrating a rear panel in accordance with the embodiment of the present disclosure, FIG. 5 is a developed view illustrating a front panel in accordance with the embodiment of the present disclosure, FIG. 6 is a developed view illustrating a modification of the rear panel illustrated in FIG. 4, and FIG. 7 is a diagram illustrating the shape of an airbag cushion in accordance with the modification of FIG. 6.

Referring to FIGS. 3 to 7, an airbag cushion 10 for a vehicle in accordance with an embodiment of the present disclosure includes a front panel 200 and a rear panel 100.

The front panel 200 is disposed in a direction facing a passenger (i.e. the left side in FIG. 3) when the airbag cushion is inflated, and has a front sewed part formed along the edge thereof.

When a vehicle collision occurs, the front panel 200 may be inflated toward the passenger so as to restrain the body of the passenger.

The front panel 200 may include a front panel body 201 and the front sewed part formed along the edge of the front panel body 201.

The rear panel 100 is coupled to the front panel 200 so as to form a chamber R therebetween, and has a gas introduction hole 150 through which gas is introduced into the chamber R. The rear panel 100 has a rear sewed part formed along the edge thereof, the rear sewed part including a region coupled to the front sewed part.

The rear panel 100 is connected to an inflator installed in a driver seat or passenger seat of a vehicle. The gas introduction hole 150 may be formed in the center of the rear panel 100, and connected to the inflator.

The rear panel 100 may include a rear panel body 101 and the rear sewed part formed along the edge of the rear panel body 101.

When an impact equal to or larger than a preset range is applied to the vehicle, the chamber R is inflated while gas is supplied to the chamber R from the inflator. At this time, the inflated and deployed airbag cushion 10 may restrain the body of the passenger and prevent the passenger from colliding with a vehicle body 5 or a part 6 of the vehicle, thereby protecting the passenger.

The rear sewed part may include a curvature part formed in a curved shape at a portion thereof, which is coupled to the front sewed part (see FIG. 3). The shape of the curvature part formed in the rear sewed part may be formed in consideration of the shape of the chamber when the airbag cushion 10 is inflated (see FIGS. 3, 6 and 7).

The rear sewed part of the rear panel 100 may have a curvature part formed along the edge thereof, and the front sewed part may have a shape corresponding to the curvature part. According to the shape of the curvature part formed in the rear sewed part (e.g. the magnitude and direction of the curvature), the deployment shape of the chamber or the airbag during inflation may be changed.

For example, when the curvature of the curvature part is increased, the size of the chamber during inflation may be increased, and the inflation volume of the upper or lower portion of the chamber may be increased. On the contrary, when the curvature of the curvature part is reduced, the size of the chamber during inflation may be reduced, and the volume of the upper or lower portion of the chamber may be reduced.

In accordance with the embodiment of the present disclosure, the shape of the curvature part may be changed in consideration of the type and internal structure of a vehicle, the arrangement of other parts and the like, which makes it possible to freely change the deployment shape of the airbag cushion. Therefore, in accordance with the embodiment of the present disclosure, the shape of the airbag cushion (or specifically, the shape of the side surface of the airbag cushion) may be implemented in various manners depending on the type of the vehicle or the installation environment of the airbag cushion.

Furthermore, in accordance with the embodiment of the present disclosure, two panels (i.e. the front panel 200 and the rear panel 100) may be coupled to each other. Thus, since the structure of the airbag cushion is simplified and the number of parts is reduced, the manufacturing cost, weight and volume of the airbag cushion can be reduced, which makes it possible to improve the packaging performance and the productivity of the airbag cushion.

Furthermore, unlike the conventional airbag cushion, the airbag cushion in accordance with the embodiment of the present disclosure has no corner portion that is formed by the side panel and the main panel, which are coupled to each other, in the conventional airbag cushion. Thus, the deployment of the airbag cushion may be speeded up to safely protect a passenger at an early stage.

The rear sewed part may include a first rear sewed part 110, a second rear sewed part 120 and a third rear sewed part 130.

In the following descriptions with reference to the developed view of the rear panel 100 illustrated in FIG. 4, a direction facing the first rear sewed part 110 from the center of the rear panel body 101 is referred to an upward direction, and a direction facing the second rear sewed part 120 from the center of the rear panel body 101 is referred to as a downward direction, for convenience of description. However, according to the installation environment of the airbag cushion, the upward and downward directions may be differently set. Furthermore, a line extended from the center of the rear panel body 101 in the top-to-bottom direction is referred to as a center line C.

The first rear sewed part 110 may be disposed at the upper portion of the rear panel body 101 based on the center of the rear panel body 101, and connected to the top of the front sewed part. In the present embodiment, the first rear sewed part 110 is sewed and coupled to a first front sewed part 210.

The first rear sewed part 110 may include a first rear center part 111 and a first rear curvature part 113.

The first rear center part 111 may be disposed in the center region of the first rear sewed part 110, and formed in a straight or curved shape.

The first rear curvature part 113 may be provided on either side of the first rear center part 111. That is, the pair of first rear curvature parts 113 may be symmetrically provided on both sides of the first rear center part 111. The first rear curvature part 113 may have one end connected to the first rear center part 111 and the other end connected to the third rear sewed part 130.

The other end of the first rear curvature part 113 may be connected to an upper coupling part 131 of the third rear sewed part 130.

The first rear curvature part 113 may have a downward curvature toward the center of the rear panel body 101. The curvature of the first rear curvature part 113 may be decided in consideration of the shape of the chamber R when the airbag cushion is inflated. According to the curvature of the first rear curvature part 113, the shape of the upper region of the inflated airbag cushion (see region B of FIG. 3) may be changed.

The second rear sewed part 120 may be disposed under the first rear sewed part 110, and coupled to the bottom of the front sewed part. In the present embodiment, the second rear sewed part 120 is sewed and coupled to a second front sewed part 220.

The second rear sewed part 120 may include a second rear center part 121 and a second rear curvature part 123.

The second rear center part 121 may be disposed in the central region of the second rear sewed part 120, and formed in a straight or curved shape.

The second rear center part 121 is disposed between the part 6 (e.g. instrument panel) and the airbag cushion when the airbag cushion is inflated. According to the distance between the second rear center part 121 and the center of the rear panel body 101 and the shape of the second rear center part 121, the distance between the part 6 and the inflated airbag cushion may be decided. Thus, the lower region of the airbag cushion may be properly inflated between the part 6 and a passenger, thereby safely protecting the passenger (see region A1 of FIG. 3).

The second rear curvature part 123 may be provided on either side of the second rear center part 121. That is, the pair of second rear curvature parts 123 may be symmetrically provided on both sides of the second rear center part 121. The second rear curvature part 123 may have one end connected to the second rear center part 121 and the other end connected to the third rear sewed part 130. Specifically, the other end of the second rear curvature part 123 may be connected to a lower coupling part 133 of the third rear sewed part 130.

The second rear curvature part 123 may have a downward curvature in a direction away from the center of the rear panel body 101. The curvature of the second rear curvature part 123 may be decided in consideration of the shape of the chamber R when the airbag cushion is inflated. According to the curvature of the second rear curvature part 123, the shape of the lower region of the inflated airbag cushion (see region A2 of FIG. 3) may be changed.

The third rear sewed part 130 is disposed between the first rear sewed part 110 and the second rear sewed part 120. The third rear sewed part 130 may include the upper coupling part 131 and the lower coupling part 133 which are divided based on the center of the rear panel body 101, and coupled to each other.

The third rear sewed part 130 may be a region of the rear sewed part, which is not coupled to the front panel 200. The upper and lower coupling parts 131 and 133 may be coupled to each other, and have the same length, based on the center of the rear panel 100. The lengths of the upper and lower coupling parts 131 and 133 may be controlled to adjust the volume of the chamber R.

The front sewed part may include the first front sewed part 210 and the second front sewed part 220.

The first front sewed part 210 may be sewed and coupled to the first rear sewed part 110. The second front sewed part 220 may be extended from the bottom of the first front sewed part 210, and sewed and coupled to the second rear sewed part 120.

Based on the center of the front panel body 201, the first front sewed part 210 may be disposed at the top of the front panel body 201, and the second front sewed part 220 may be disposed at the bottom thereof. The first and second front sewed parts 210 and 220 are connected to each other.

The first front sewed part 210 may include a first front center part 211 and a first front curvature part 213.

The first front center part 211 may be formed to correspond to the first rear center part 111, and sewed and coupled to the first rear center part 111.

The first front curvature part 213 may be provided on either side of the first front center part 211. That is, the pair of first front curvature parts 213 may be symmetrically provided on both sides of the first front center part 211. The first front curvature part 213 may be formed to have a curvature corresponding to the first rear curvature part 113, and sewed and coupled to the first rear curvature part 113. The first front curvature part 213 may be curved in a direction away from the center of the front panel 200.

The second front sewed part 220 may include a second front center part 221 and a second front curvature part 223.

The second front center part 221 may be formed in a shape corresponding to the second rear center part 121, and sewed and coupled to the second rear center part 121.

The second front curvature part 223 may be provided on either side of the second front center part 221. That is, the pair of second front curvature parts 223 may be symmetrically provided on both sides of the second front center part 221. The second front curvature part 223 may be formed to have a curvature corresponding to the second rear curvature part 123, and sewed and coupled to the second rear curvature part 123. The second front curvature part 223 may be curved in a direction facing the center of the front panel 200.

The curvatures of the first and second front curvatures parts 213 and 223 may be decided in consideration of the shape of the chamber when the airbag cushion is inflated.

FIGS. 6 and 7 illustrate first and second modifications 100a and 100b of the rear panel in accordance with the embodiment of the present disclosure. Referring to FIGS. 6 and 7, the shape of the chamber depending on the shape of the curvature part of the rear panel will be described.

A first modification 200a of the front panel may be formed to correspond to the first modification 100a of the rear panel, and a second modification 200b of the front panel may be formed to correspond to the second modification 100b of the rear panel.

The first modification 100a of the rear panel may include a rear panel body 101a and a rear sewed part. The rear sewed part may include a first rear sewed part 110a, a second rear sewed part 120a and a third rear sewed part 130a. The first rear sewed part 110a may include a first rear center part 111a and a first rear curvature part 113a, the second rear sewed part 120a may include a second rear center part 121a and a second rear curvature part 123a, and the third rear sewed part 130a may include an upper coupling part 131a and a lower coupling part 133a.

The second modification 100b of the rear panel may include a rear panel body 101b and a rear sewed part. The rear sewed part may include a first rear sewed part 110b, a second rear sewed part 120b and a third rear sewed part 130b. The first rear sewed part 110b may include a first rear center part 111b and a first rear curvature part 113b, the second rear sewed part 120b may include a second rear center part 121b and a second rear curvature part 123b, and the third rear sewed part 130b may include an upper coupling part 131b and a lower coupling part 133b.

The curvatures of the first rear curvature part 113a and a first front curvature part 213a, which are installed in the first modification of the airbag cushion, may be smaller than those of the first rear curvature part 113b and a first front curvature part 213b, which are installed in the second modification of the airbag cushion.

Thus, when the airbag cushion is inflated, the slope of the upper region of the first modification may be gentler than that of the upper region of the second modification (see FIG. 7).

The curvatures of the second rear curvature part 123a and a second front curvature part 223a, which are installed in the first modification of the airbag cushion, may be larger than those of the second rear curvature part 123b and a second front curvature part 223b, which are installed in the second modification of the airbag cushion.

Thus, when the airbag cushion is inflated, the volume of the lower region of the first modification may be larger than that of the lower region of the second modification (see FIG. 7).

In this way, the shapes of the curvature parts of the front and rear panels may be adjusted according to the internal structure of the vehicle, the distance between the vehicle body and a passenger and the like. Thus, the deployment shape of the airbag cushion may be changed in various manners.

In accordance with the embodiment of the present disclosure, the shape of the curvature part may be changed in consideration of the type and internal structure of a vehicle, the arrangement of other parts and the like, which makes it possible to freely change the deployment shape of the airbag cushion. Therefore, in accordance with the embodiment of the present disclosure, the shape of the airbag cushion (or specifically, the shape of the side surface of the airbag cushion) may be implemented in various manners depending on the type of the vehicle or the installation environment of the airbag cushion.

In accordance with the embodiment of the present disclosure, two panels (i.e. the front panel and the rear panel) may be coupled to each other, which makes it possible to simplify the structure of the airbag cushion and to reduce the number of parts. Thus, since the manufacturing cost, weight and volume of the airbag cushion can be reduced, the packaging performance and the productivity may be improved.

Furthermore, unlike the conventional airbag cushion, the airbag cushion in accordance with the embodiment of the present disclosure has no corner portion that is formed by the side panel and the main panel, which are coupled to each other, in the conventional airbag cushion. Thus, the deployment of the airbag cushion may be speeded up to safely protect a passenger at an early stage.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An airbag cushion for a vehicle, comprising:
a front panel disposed in a direction facing a passenger when the airbag cushion is inflated, and having a front sewed part formed along an edge thereof; and
a rear panel coupled to the front panel so as to form a chamber therebetween, having a gas introduction hole to introduce gas into the chamber, and having a rear sewed part formed along an edge thereof, the rear sewed part being coupled to the front sewed part,
wherein the rear sewed part has a curvature part formed in a curved shape at a portion coupled to the front sewed part, and wherein the rear sewed part comprises:
a first rear sewed part disposed at an upper portion of the rear panel based on a center of the rear panel, and coupled to a top of the front sewed part, wherein the first rear sewed part comprises:
a first rear center part; and
a first rear curvature part disposed on either side of the first rear center part, having one end connected to the first rear center part and another end connected to the upper coupling part, and having a downward curvature toward the center of the rear panel;
a second rear sewed part disposed under the first rear sewed part, and coupled to a bottom of the front sewed part; and
a third rear sewed part disposed between the first and second rear sewed parts, and comprising an upper coupling part and a lower coupling part, which are divided based on the center of the rear panel and coupled to each other.

2. The airbag cushion of claim 1, wherein the second rear sewed part comprises:
a second rear center part; and
a second rear curvature part disposed on either side of the second rear center part, having one end connected to the second rear center part and another end connected to the lower coupling part, and having a downward curvature in a direction away from the center of the rear panel.

3. The airbag cushion of claim 2, wherein the curvatures of the first and second rear curvature parts are based on a shape of the chamber when the airbag cushion is inflated.

4. The airbag cushion of claim 2, wherein the front panel comprises a front panel body having the front sewed part formed along the edge thereof,
wherein the front sewed part comprises:
a first front sewed part coupled to the first rear sewed part; and
a second front sewed part extended from a bottom of the first front sewed part, and coupled to the second rear sewed part.

5. The airbag cushion of claim 4, wherein the first front sewed part comprises:
a first front center part formed to correspond to the first rear center part, and coupled to the first rear center part; and
a first front curvature part provided on either side of the first front center part, having a curvature corresponding to the first rear curvature part, and coupled to the first rear curvature part.

6. The airbag cushion of claim 4, wherein the second front sewed part comprises:
a second front center part formed to correspond to the second rear center part, and coupled to the second rear center part; and
a second front curvature part provided on either side of the second front center part, having a curvature corresponding to the second rear curvature part, and coupled to the second rear curvature part.

7. The airbag cushion of claim 1, wherein a shape of the curvature part is based on a shape of the chamber when the airbag cushion is inflated.

* * * * *